Dec. 18, 1956 A. GRANNENFELT 2,774,371
SLUICE VALVE
Filed July 3, 1952 3 Sheets-Sheet 1

Inventor
Allan Grannenfelt
By Wenderoth, Lind & Ponack
Attorneys

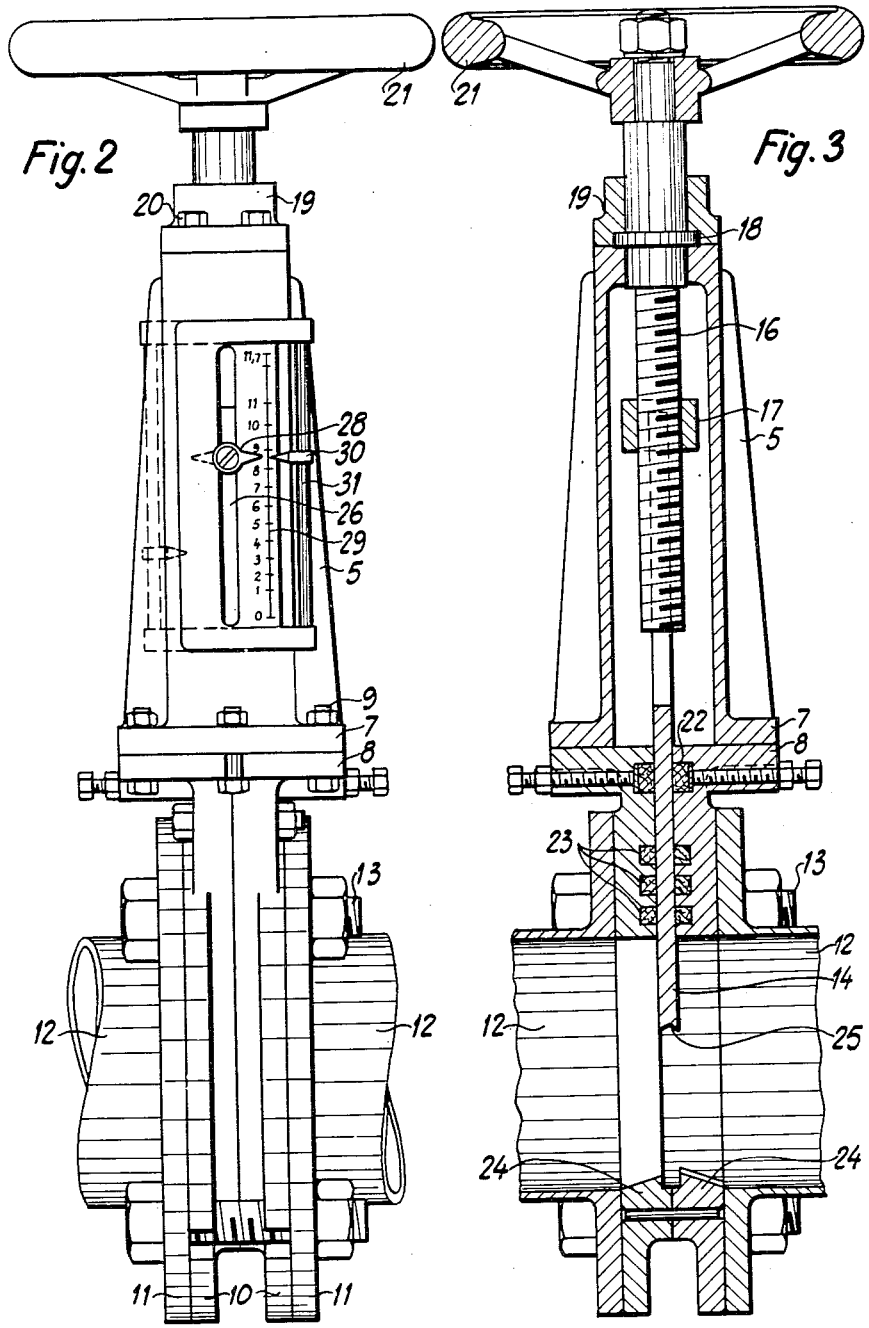

Dec. 18, 1956   A. GRANNENFELT   2,774,371
SLUICE VALVE
Filed July 3, 1952   3 Sheets-Sheet 3

Inventor
Allan Grannenfelt
By
Wenderoth, Lind + Ponack
Attorneys

United States Patent Office 2,774,371
Patented Dec. 18, 1956

2,774,371

SLUICE VALVE

Allan Grannenfelt, Stockholm, Sweden

Application July 3, 1952, Serial No. 297,124

Claims priority, application Sweden July 10, 1951

1 Claim. (Cl. 137—242)

This invention relates to a sluice valve, especially adapted to be used in pulp lines. A difficulty encountered in such valves is the provision of a reliable sealing between the valve disc and the bottom of the valve case, impurities and fibres in the flowing suspension being easily jammed between the valve case and the disc when the latter is being closed.

The object of the invention is to provide a reliable sealing of such valves. The invention is characterized in that two sharp-edged ledges are arranged inside the valve case, one at each side of the valve disc, to provide a seal between the disc and the case, said ledges starting from diametrically opposite sides of the valve case and one extending beyond the other only a short distance at the bottom of the case.

The device according to the invention is hereinafter more fully described with reference to the accompanying drawings, which show a preferred embodiment.

In the drawings:

Figures 2 and 3 are a side elevation and a sectional elevation thereof respectively.

Figure 1:
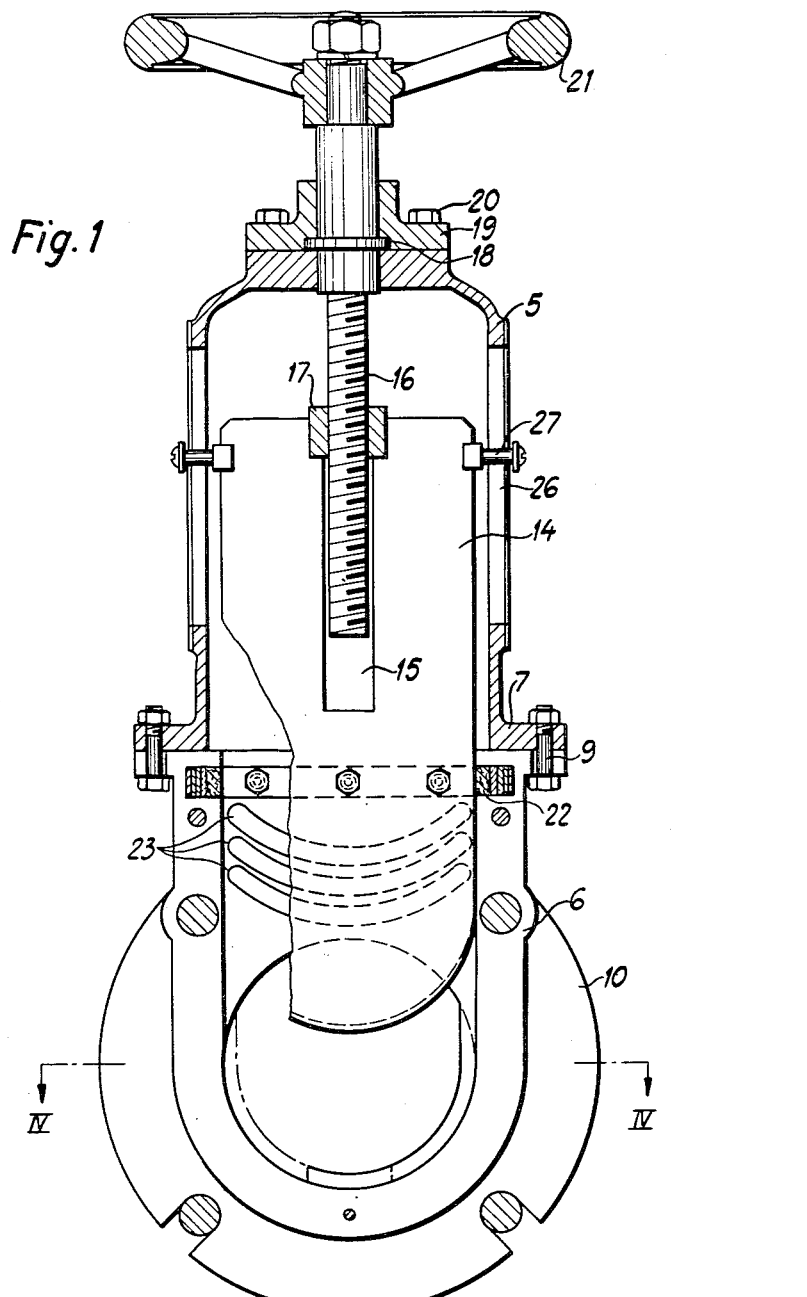
Figure 1 is a sectional elevation of the valve.

The valve case consists of three parts, an upper hollow part 5, made in one piece, for instance of cast iron, and adapted to support the valve spindle, and two lower parts 6, forming the sides of the case and adapted to be mounted in a pipe line. For this purpose said parts 6 are provided in a manner known per se with openings having the same dimensions as the inner diameter of the pipe line. The upper part 5 of the valve case (the cover) is provided at its lower edge with a surrounding flange 7 intended to contact corresponding flanges 8 on the lower elements 6. The case is screwed together by bolts 9 inserted through the flanges 7 and 8.

The two lower parts of the case are further provided with circular flanges 10 intended to contact corresponding flanges 11 on tubes 12 between which the case is to be mounted. The flanges 10 and 11 are fastened to each other by bolts 13.

The disc 14 mounted in the valve case is provided at its upper part with a longitudinal slot 15 to receive the valve spindle 16. The threaded end of the spindle 16 traverses a nut 17 fixed to the disc 14 at the outer end of the slot 15. The smooth upper part of the spindle 16 is journalled in the cover 5. In order to prevent axial displacement the spindle 16 is provided with a ring 18 resting on the outside of the cover 5 and held in this position by means of a sleeve 19 fixed to the cover by bolts 20. A hand wheel 21 is fixed to the outer end of the spindle.

In order to provide a safe sealing outwardly between the disc 14 and the valve case, a packing 22 is placed in recesses arranged for this purpose just below the upper ends of the two case members 6.

Further sealing of the disc 14 is provided by three arcuate packings 23, likewise made of some lubricating material such as hemp and tallow, and placed in corresponding recesses in the case members 6. These packings also serve to keep the disc 14 free from impurities such as fibres, etc.

Figure 4:
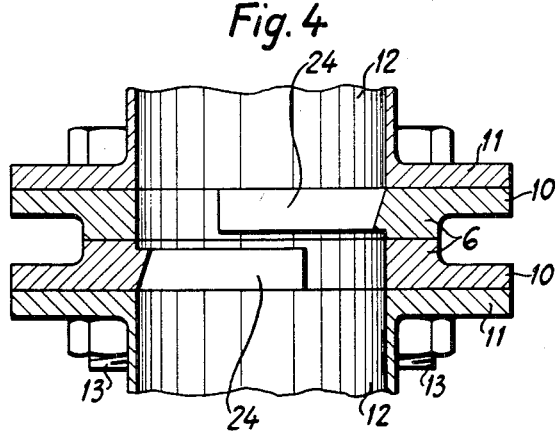
Figure 4 is a section along the line IV—IV in Figure 1.

In order to provide a reliable sealing between the disc 14 and the inside of the case, two sharp-edged ledges 24 are arranged as seen in Figures 1, 3 and 4. Said ledges pass downwardly along the inner periphery of the case, one at each side of the disc, and extending beyond each other only a short distance at the bottom of the case, as seen in Figure 4. In this way, fibres and other solid particles are able to escape in two opposite directions from the short channel formed between the ledges at the bottom of the case.

As seen in Figure 3, the lower end of the disc 14 has a peripheral groove 25, so that two acute-angled cutting edges are formed, each co-operating with the sharp edge on the corresponding ledge 24. This ensures that fibres are effectively cut when jammed between the two co-operating edges.

As seen in Figures 1 and 2, the upper case part or cover 5 is provided with longitudinal slots 26, running along the edges of the disc 14. Bolts 27 fixed to the disc 14 project through these slots. Outside the cover 5 the bolts 27 carry pointers 28, associated with a graduated scale 29. The scale is graduated in such a manner that the pointers 28 indicate the degree to which the valve is opened. Another pointer 30 is slidably mounted along a guide rail 31, arranged along each of the scales outside the case. The pointer 30 may be adjusted to indicate the desired flow area for the valve at a certain concentration of the suspension flowing through the valve.

What I claim is:

Sluice valve to be used in pulp lines, comprising a case having a flow passage extending therethrough, a disc movable in an opening in said case intersecting said flow passage, two sharp-edged ledges arranged inside said valve case bordering said opening, one at each side of said disc providing a seal between said disc and said case, said ledges starting from diametrically opposite sides of said flow passage and extending beyond each other only a short distance at the bottom of the case, the bottom end of said disc having a central peripheral groove, so that two acute-angled cutting edges are formed, each cooperating with the sharp edge on the corresponding ledge.

References Cited in the file of this patent

UNITED STATES PATENTS

| 287,788 | Abel | Nov. 6, 1883 |
| 1,545,696 | Riley | July 14, 1925 |
| 2,000,853 | Lange | May 7, 1935 |
| 2,001,271 | Smith | May 14, 1935 |